United States Patent
Bonwick et al.

(10) Patent No.: US 7,225,314 B1
(45) Date of Patent: May 29, 2007

(54) AUTOMATIC CONVERSION OF ALL-ZERO DATA STORAGE BLOCKS INTO FILE HOLES

(75) Inventors: Jeffrey S. Bonwick, Los Altos, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 378 days.

(21) Appl. No.: 10/853,915

(22) Filed: May 26, 2004

(51) Int. Cl.
*G06F 12/00* (2006.01)
(52) U.S. Cl. .................................... 711/170
(58) Field of Classification Search ............... 711/170, 711/114
See application file for complete search history.

(56) References Cited

U.S. PATENT DOCUMENTS

| | | | |
|---|---|---|---|
| 5,371,885 A | 12/1994 | Letwin | |
| 6,745,305 B2 * | 6/2004 | McDowell | .................. 711/162 |
| 7,007,196 B2 * | 2/2006 | Lee et al. | ...................... 714/9 |
| 7,043,677 B1 | 5/2006 | Li | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2004/0098720 A1 | 5/2004 | Hooper | |

OTHER PUBLICATIONS

USPTO Office Action dated Jul. 27, 2006, regarding U.S. Appl. No. 10/919,878 (13 pages.
Goodheart, Berny and Cox, James, "The Magic Garden Explained", Prentice Hall, pp. 24-25, 29-30, 390-391, 1994. (8 pages).
Austin, B.J., "A Dynamic Disc Allocation Algorithm Designed to Reduce Fragmentation During File Reloading", pp. 378-381, 1970. (4 pages).
Stallings, William, "Computer Organization and Architecture: *Designing for Performance*", Prentice Hall, Fifth Edition, pp. 377-378, 2000. (4 pages).
USPTO Office Action dated Aug. 17, 2006, regarding U.S. Appl. No. 10/853,837 (19 pages).

* cited by examiner

*Primary Examiner*—Hiep T. Nguyen
(74) *Attorney, Agent, or Firm*—Osha Liang LLP (57) ABSTRACT

A method for storing a first data block, including evaluating the first data block comprising a first plurality of data, if the first plurality of data includes only zeros storing a first block pointer indicating that the first data block includes only zeros in a first indirect block, and if the first plurality of data does not include only zeros storing the first calculating a first data block checksum for the first data block, and storing the first block pointer comprising the first data block location and the first data block checksum in the first indirect block.

21 Claims, 7 Drawing Sheets

AUTOMATIC CONVERSION OF ALL-ZERO DATA STORAGE BLOCKS INTO FILE HOLES

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system), typically provides file manipulation interfaces to open, close, read, and write the data within each file. More specifically, the file system stores data on the storage device by managing the allocation of space within the storage device. Typically, the volume manager provides space, which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocations use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Additionally, many file systems support sparse files, which are files that include regions that have never been written with data. Sparse files may not be completely blank; rather, in between data, regions may exist that do not contain any data. These regions are typically referred to as holes. Conventionally, if a user or application attempts to read from a hole, the file system detects that no underlying data exists and returns all zeros. Moreover, file systems may not allocate resources for holes in order to save physical disk space.

In some instances, data stored in files within a file system may be large blocks of data that do not include much content. In this case, the large amount of data stored by users may be compressed (i.e., reduced in size without loss of information). An extreme case of this would be when users store large blocks of data that include many contiguous zeros.

SUMMARY

In general, in one aspect, the invention relates to a method for storing a first data block, comprising evaluating the first data block comprising a first plurality of data, if the first plurality of data includes only zeros storing a first block pointer indicating that the first data block includes only zeros in a first indirect block, and if the first plurality of data does not include only zeros storing the first data block in a storage pool, obtaining a first data block location for the first data block, calculating a first data block checksum for the first data block, and storing the first block pointer comprising the first data block location and the first data block checksum in the first indirect block.

In general, in one aspect, the invention relates to a method for retrieving data in a data block, comprising obtaining an indirect block comprising a block pointer associated with the data block, determining whether the block pointer comprises a zero reference, indicating that the data block includes all zeros, if the block pointer comprises a zero reference, and retrieving the data from the data block, if the block pointer does not include a zero reference.

In general, in one aspect, the invention relates to a system for storing a data block, comprising a storage pool comprising the data block and a first indirect block, wherein the first indirect block comprises a data block checksum and a data block location, and a storage pool allocator configured to store the data block and the first indirect block in the storage pool, de-allocate the data block if the data block includes all zeros, and de-allocate the first indirect block, if the first indirect block includes all zeros.

In general, in one aspect, the invention relates to a computer system for storing a first data block, comprising a processor, a memory, a storage device, and software instructions stored in the memory for enabling the computer system under control of the processor, to evaluate the first data block comprising a first plurality of data, if the first plurality of data includes only zeros store a first block pointer indicating that the first data block includes only zeros in a first indirect block, if the first plurality of data does not include only zeros store the first data block in a storage pool, obtain a first data block location for the first data block, calculate a first data block checksum for the first data block, and store the first block pointer comprising the first data block location and the first data block checksum in the first indirect block.

In general, in one aspect, the invention relates to a computer system for retrieving data in a data block, comprising a processor, a memory, a storage device, and software instructions stored in the memory for enabling the computer system under control of the processor, to obtain an indirect block comprising a block pointer associated with the data block, determine whether the block pointer comprises a zero reference, indicate that the data block includes all zeros, if the block pointer comprises a zero reference, and retrieve the data from the data block, if the block pointer does not include a zero reference.

In general, in one aspect, the invention relates to a network system having a plurality of nodes, comprising a storage pool comprising the data block and a first indirect block, wherein the first indirect block comprises a data block checksum and a data block location, and a storage pool allocator configured to store the data block and the first indirect block in the storage pool, de-allocate the data block, if the data block includes all zeros, and de-allocate the first indirect block, if the first indirect block includes all zeros, wherein the storage pool is located on any one of the plurality of nodes, and wherein the storage pool allocator is located on any one of the plurality of nodes.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to converting all-zero data blocks into file holes. Specifically, embodiments of the invention relate to freeing underlying physical disk space when a user writes contiguous zeros to a file. More specifically, the freed disk space is converted to a file hole, for which file system resources are not allocated.

Figure 1:
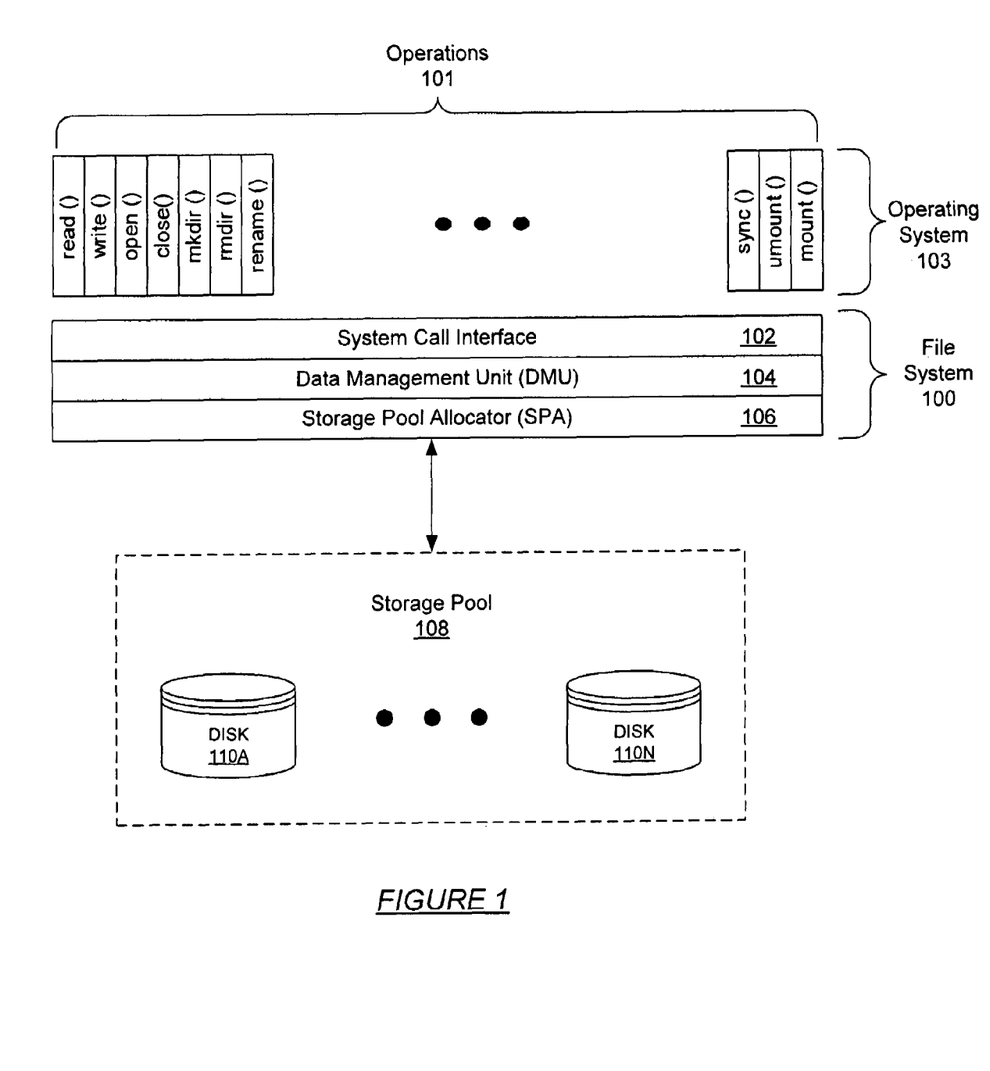
FIG. 1 shows a system architecture in accordance with an embodiment of the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

In one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). The DMU (104) represents the objects as data blocks and indirect blocks (described below in FIG. 3). Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks 110A-110N). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
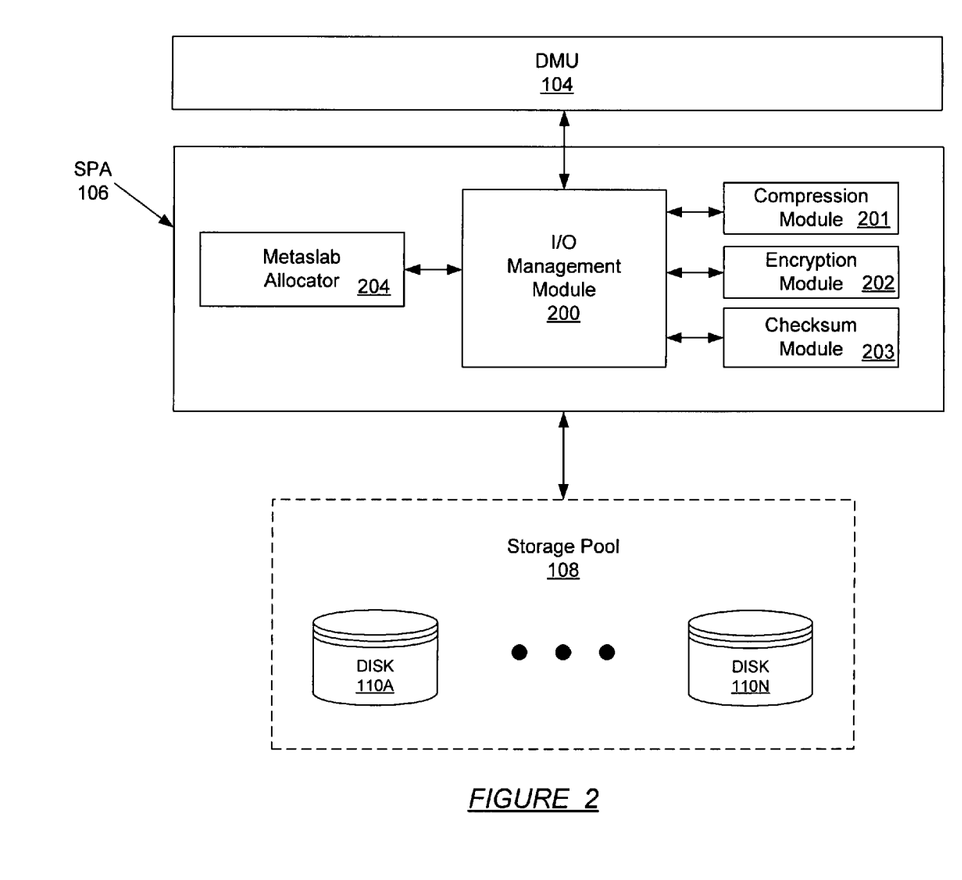
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of the aforementioned components is described below. As noted above, the SPA (106) receives transactions from the DMU (104). More specifically, the I/O management module (300), within the SPA (106) receives transactions from the DMU (102) and groups the transactions into transaction groups.

In one embodiment of the invention, the compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). In one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated to large blocks.

The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
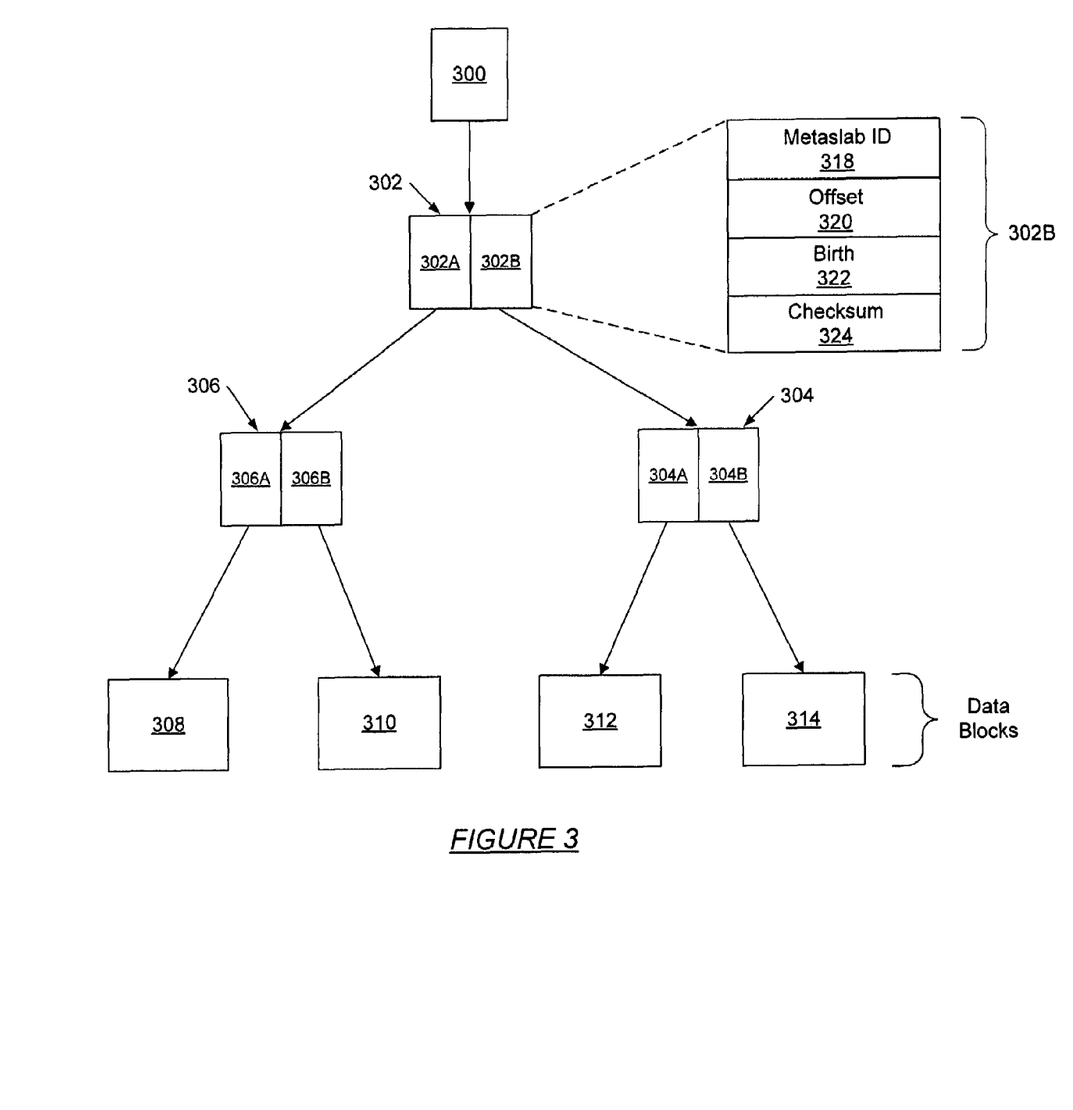
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, 306). In one embodiment of the invention, indirect blocks (302, 304, 306) may be arrays of block pointers (e.g., 302A, 302B, etc.) that, directly or indirectly, reference to data blocks (308, 310, 312, 314). The data blocks (308, 310, 312, 314) contain actual data of files stored in the storage pool. One skilled in the art will appreciate that there may be several layers of indirect blocks between the root block (300) and the data blocks (308, 310, 312, 314).

In contrast to the root block (300), indirect blocks and data blocks may be located anywhere in the storage pool. In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer.

In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve the data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until modified version of the data blocks and indirect blocks are committed).

In one embodiment of the invention, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending the I/O request to the SPA. The indirect blocks containing the block pointers are typically written one level at a time. To complete the copy-on-write transaction, the SPA issues a single write that atomically changes the root block to reference the indirect blocks referencing the modified data block.

Using the infrastructure shown in FIGS. 1-3, the following discussion describes a method of converting all-zero data into file holes. Specifically, in one embodiment of the invention, file holes are represented as block pointers that include a unique reference to signify that the block pointed to by the block pointer is a file hole. For example, in one embodiment of the invention, block pointers associated with file holes may contain zeros to indicate that the block pointed to by the block pointer does not include data but rather, includes only zeros (i.e., an all-zero block pointer). This is possible because the file system does not use zero as a valid virtual block address. One skilled in the art will appreciate that any other non-valid address may be used to represent a block pointer that references a file hole, such as a negative one (i.e., "−1").

More specifically, as noted above, data blocks may be referenced by one or more indirect blocks. If a data block contains all-zeros (i.e., is a file hole) in the file system, the data block may be represented by a block pointer in the parent indirect block that points to an empty block. Similarly, indirect blocks, which are composed of an array of blocks pointers that all point to empty data blocks may also be converted to a file hole. In this manner, both data and metadata may be represented as file holes. Additionally, file system resources (i.e., disk space, block pointers, etc.) are not allocated for any data block or indirect block that is converted to a file hole.

In one embodiment of the invention, conversion of all-zero data segments to file holes may occur when data in a file is modified. For example, a file may not contain any all-zero data segments until an application or process requests to modify the data within the file. At this stage, the application/ process may write all-zero data blocks to portions of the file, allowing those portions to be converted to file holes by the file system.

Figure 4:
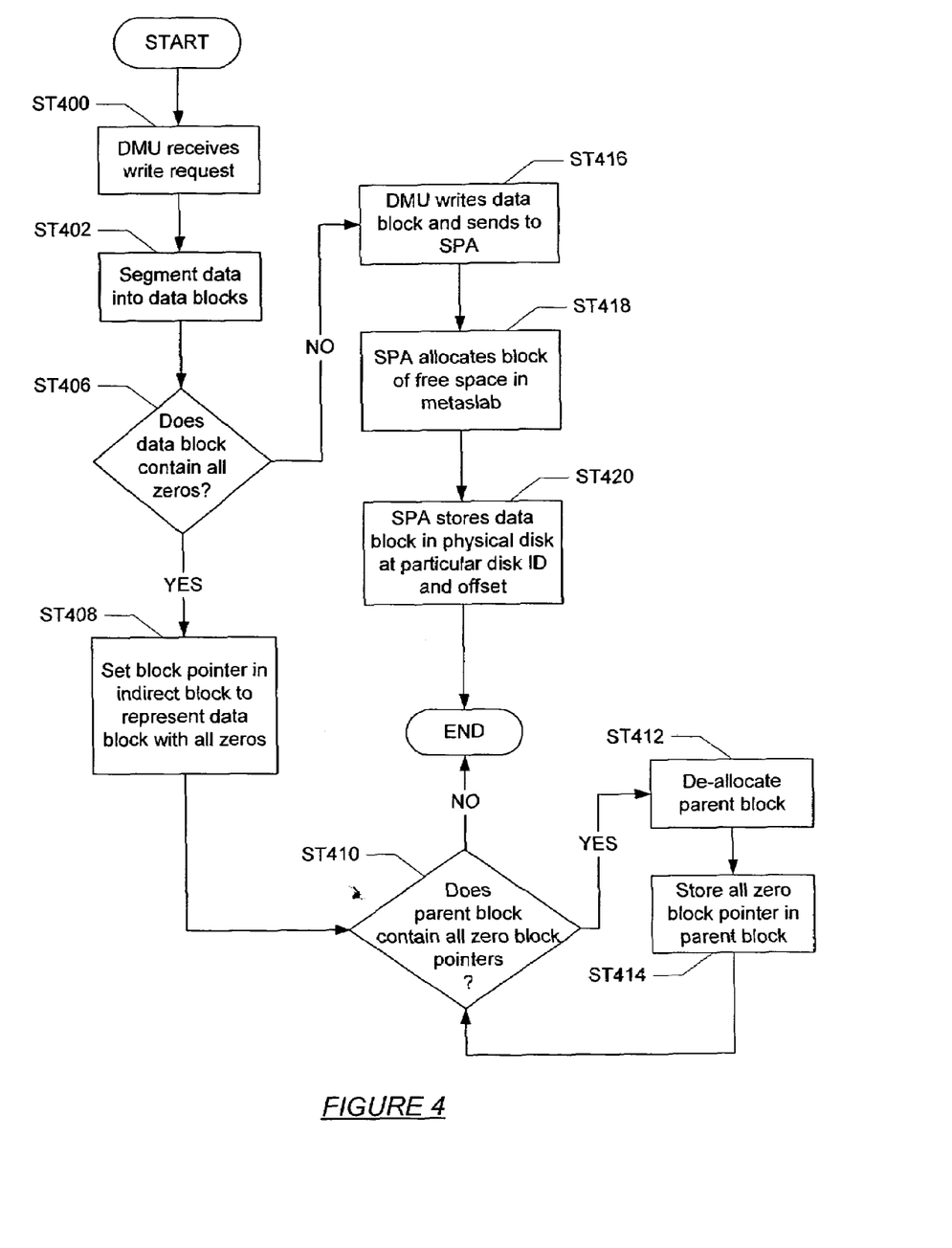
FIG. 4 shows a flow chart for converting an all-zero data block to a file hole in accordance with an embodiment of the invention.

FIG. 4 shows a flow chart for converting all-zero data into file holes in accordance with one embodiment of the invention. Initially, the DMU receives a write request from an application or process using the file system (Step 400). Subsequently, the data is segmented into data blocks by the DMU (Step 402). At this stage, each data block is examined to determine whether the data block contains only zeros (Step 406). If any of the data blocks contain only zeros, then the block pointer (in the indirect block) referencing that data block is set to an all-zero block pointer (Step 408). In other words, the data blocks containing only zeros are not stored by the file system in the storage pool; rather the block pointer referencing the data block with only zeros represents the data block as a file hole.

Once all the data blocks that contain only zeros have been determined by the DMU, the parent blocks (e.g., indirect blocks) that reference file holes are examined to determine whether every block pointer within the parent block also includes only zeros (i.e., the parent block includes block pointers that all reference file holes) (Step 410). If the parent block contains all-zero block pointers, then the parent block is de-allocated from the tree (Step 412). In other words, if the entire parent block references file holes, then the parent block itself may be converted into a file hole. In one embodiment of the invention, this may be represented by converting the block pointer that references the parent block into an all-zero block pointer. One skilled in the art will appreciate that the process of examining each parent block that references file holes continues until a parent block that references data is encountered. At this stage, any parent block that referenced only file holes is de-allocated and the process ends.

Returning to Step 406, if the data blocks for the data to be written does not contain only zeros (i.e., contains actual data), then the DMU writes the data blocks and forwards the data blocks to the SPA (Step 416). Subsequently, the SPA allocates a block of available space in a particular metaslab (Step 418), and stores the data block at the disk ID and offset value specified by the metaslab ID (in the metaslab from which a block of available space was allocated) (Step 420). At this stage, the data blocks (including data) are stored into a particular physical disk location and the process ends. In one embodiment of the invention, this process may repeat for every write request received by the DMU.

Figure 5:
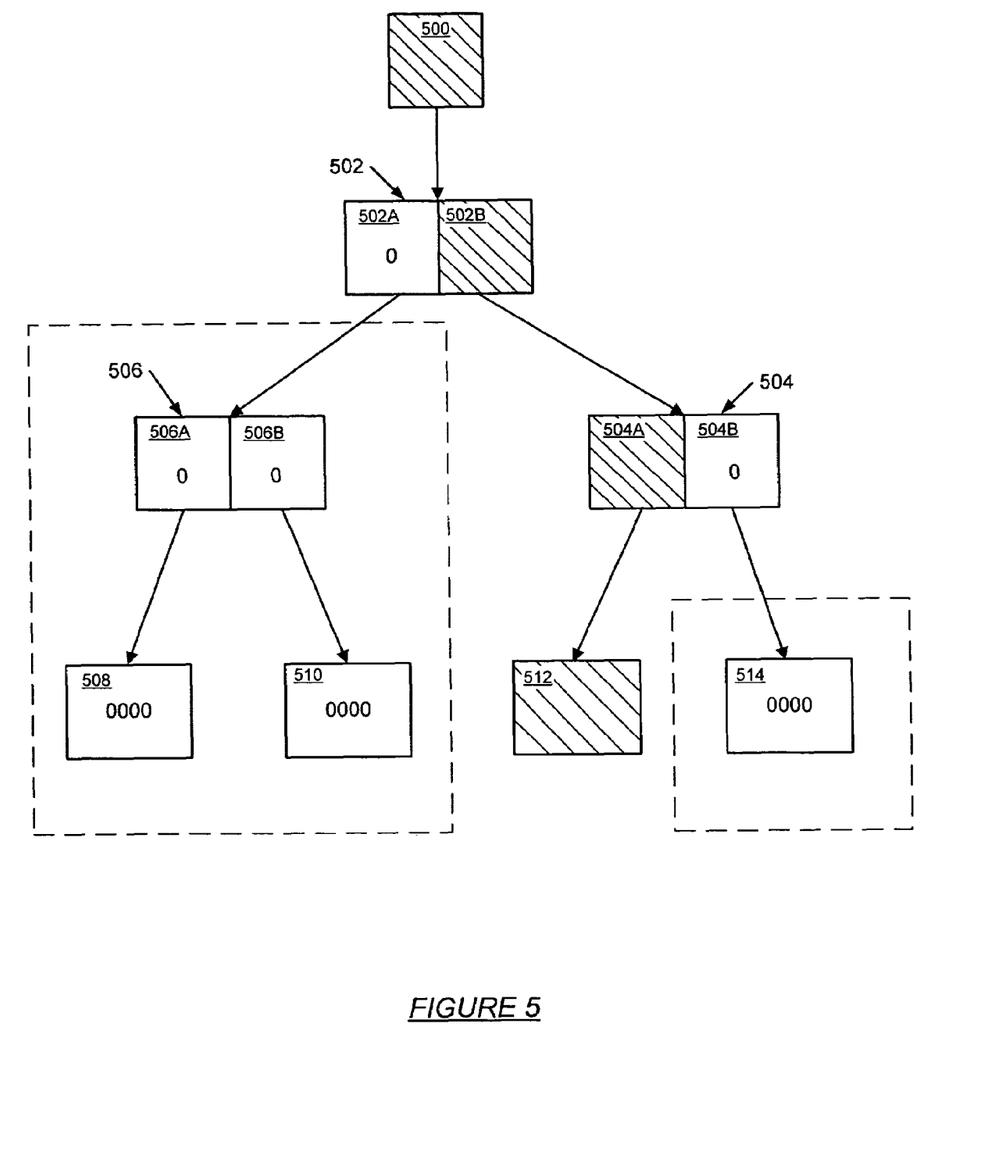
FIG. 5 shows an example of representing file holes in accordance with an embodiment of the invention.

FIG. 5 shows an example of representing file holes in accordance with one embodiment of the invention. Specifically, below the root block of the tree (500), the block pointers (502B, 504A, 512) include actual data (indicated by the shaded boxes in FIG. 5). In contrast, the data blocks with zeros (508, 510, 514) represent file holes, and the all-zero block pointers (502A, 504B, 506A, 506B) reference file holes. In one embodiment of the invention, file holes (508, 510, 514) are written by the DMU. Because file holes (508, 510, 514) contain all zeros, the file holes are not stored in the storage pool in the same manner as data blocks containing data would be stored. Rather, the block pointers (502A, 504B, 506A, 506B) referencing file holes are all-zero block pointers which signify that the data blocks (508, 510, 514) are file holes. Therefore, when retrieving file holes, the block pointers referencing file holes allow the file system to know that the particular data block to be retrieved is a file hole (as described in FIG. 6).

As noted above, in one embodiment of the invention, if all the block pointers within a particular indirect block are all-zero block pointers, then the indirect block itself may be converted to a file hole. For example, in FIG. 5, indirect block (506) has two block pointers which are all-zero block pointers (506A, 506B). In this case, indirect block (506) may be converted to a file hole so that no physical disk space is allocated for that indirect block. In one embodiment of the invention, to represent the de-allocated indirect block (506), the block pointer that references the de-allocated indirect block (506) becomes an all-zero block pointer (502A).

In one embodiment of the invention, if a file is completely overwritten with zeros, all the data blocks and indirect blocks representing the file may be converted to file holes. In other words, the particular tree representing the location of the file (i.e., the data block containing the data and all associated indirect blocks) will be freed and converted to file holes.

Figure 6:
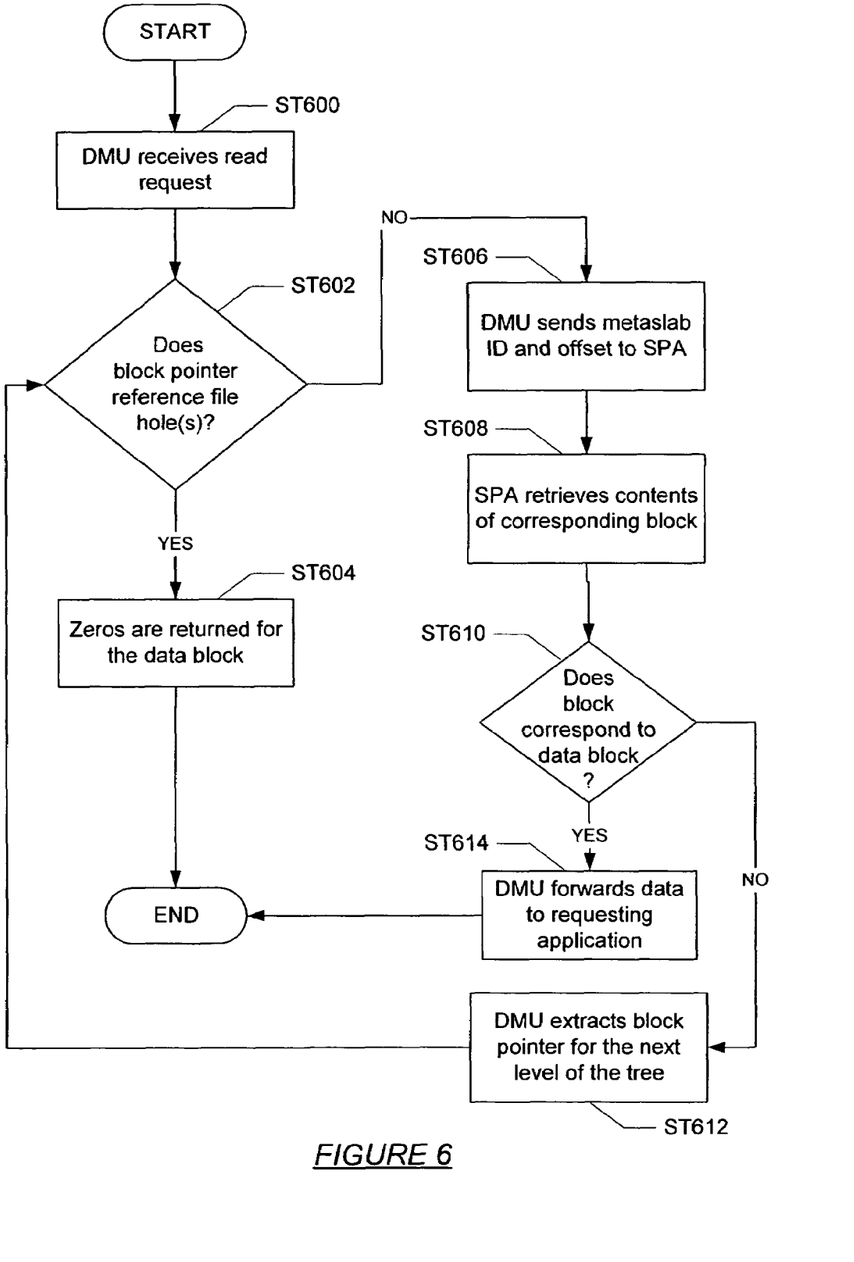
FIG. 6 shows a flow chart for retrieving file holes in accordance with an embodiment of the invention.

FIG. 6 shows a flow chart for retrieving all-zero data in accordance with one embodiment of the invention. Initially, the DMU receives a read request from an application or user associated with the file system (Step 600). Subsequently, a determination is made to check whether the block pointer is an all-zero block pointer that references a file hole (Step 602). If the block pointer (directly or indirectly referencing the data block) is an all-zero block pointer, then the DMU returns logical zeros to the application or process that requested the read operation (Step 604) and the process ends. In this manner, the SPA and DMU do not have to traverse the tree to the last level to retrieve the data block to be read. Rather, once a block pointer referencing a file hole is encountered, zeros may be returned as the contents of the particular data block that is referenced by the all-zero block pointer.

Alternatively, if the contents of the block pointer includes metadata referencing another block, then the DMU sends the metaslab ID and offset from the contents of the block to the SPA (Step 606). The SPA then retrieves contents of the block corresponding to the metaslab ID and offset (Step 608). In one embodiment of the invention, the SPA translates the metaslab ID and offset to a physical location (i.e., disk ID and disk offset) and retrieves the contents of the block from the physical location. If the block corresponds to the data block to be read (Step 610), then the DMU forwards data to the requesting application or user (Step 614) and the process ends. In contrast, if the block does not correspond to the data block (Step 610), the DMU extracts the block pointer in the next level of the tree that references the data block (Step 612) and Steps 602-614 are subsequently repeated until the data block or a block pointer referencing a file hole is encountered.

Figure 7:
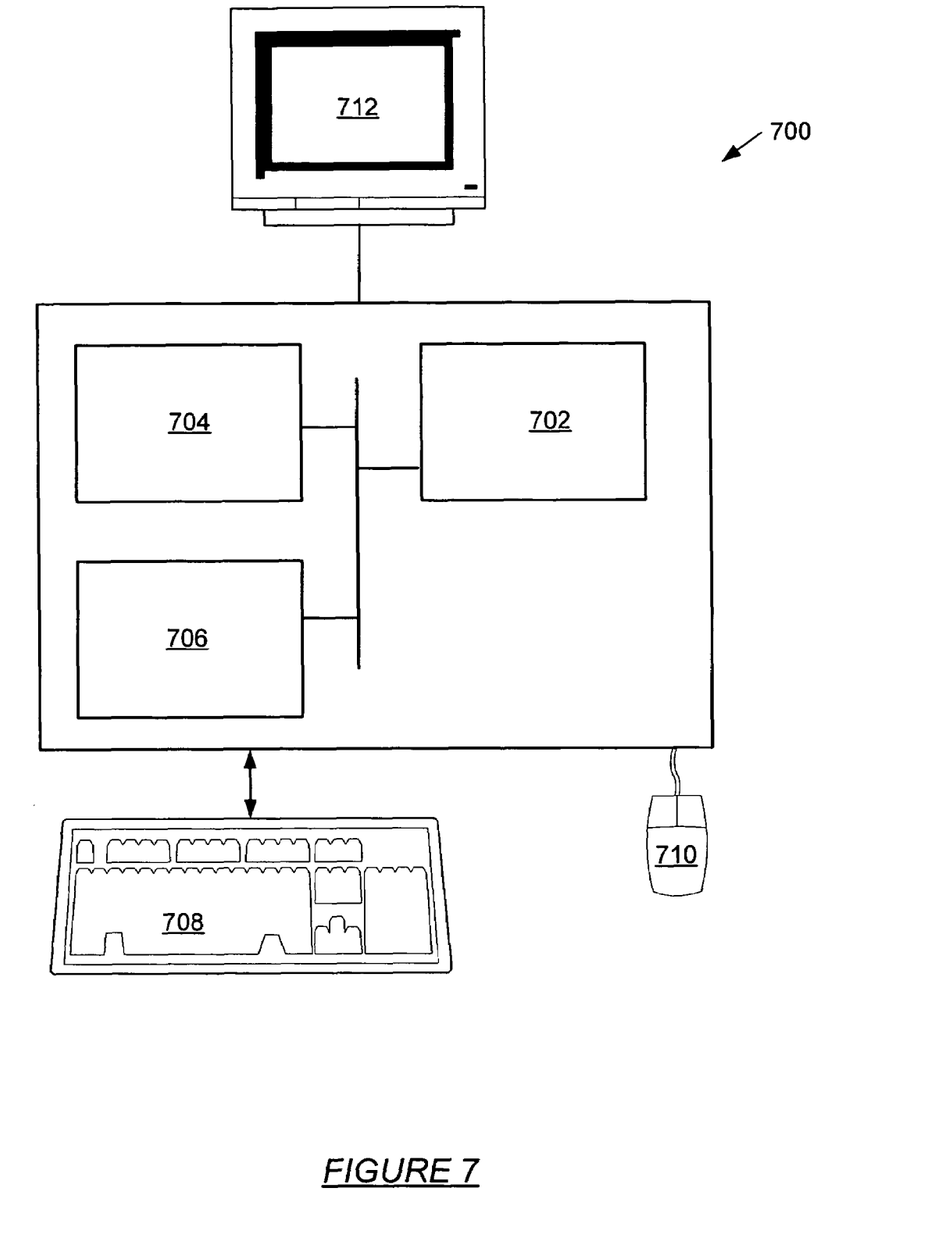
FIG. 7 shows a computer system in accordance with an embodiment of the invention.

An embodiment of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms. Further, those skilled in the art will appreciate that one or more elements of the aforementioned computer (700) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Embodiments of the invention may include the ability to compress both data blocks and indirect blocks by representing holes as all-zero block pointers. Thus, both data and metadata are capable of being converted to file holes. This enables the file system to save resources (i.e., physical disk space) by deallocating data blocks and indirect blocks that previously represented data and now represent file holes. Moreover, embodiments of the invention allow the reclamation of storage space that would otherwise be wasted by converting logical zeros within sparse files to file holes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a file comprising a file hole, the method comprising:
    obtaining the file, wherein the file comprises a first data block and a second data block, wherein the first data block is associated with the file hole and consists only of zeros;
    storing a first block pointer comprising a zero reference in a first indirect block, wherein the zero reference indicates that the first data block consists only of zeros;
    storing the second data block; and
    storing a second block pointer in a second indirect block, wherein the second block pointer references the second data block and comprises a second data block location,
    wherein the first data block is not stored.

2. The method of claim 1, wherein the file further comprises a third data block wherein the third data block is associated with the file hole and consists only of zeros and wherein the method further comprises:
    storing a third block pointer comprising a zero reference in the first indirect block, wherein the zero reference indicates that the third data block consists only of zeros, wherein the third data block is not stored.

3. The method of claim 2, further comprising:
    de-allocating the first indirect block, wherein the first indirect block comprises a plurality of block pointers that comprise only zero references.

4. The method of claim 1, wherein the file comprises a fourth data block and the wherein method further comprises:
    storing the fourth data block; and
    storing a fourth block pointer in the second indirect block, wherein the fourth block pointer references the fourth data block and comprises a fourth data block location.

5. The method of claim 1, further comprising:
    storing a third indirect block comprising a block pointer referencing the first indirect block.

6. The method of claim 5, further comprising:
    de-allocating the third indirect block, wherein each of a plurality of block pointers in the third indirect block comprise a zero reference.

7. The method of claim 1, wherein the first data block is assembled using a data management unit.

8. The method of claim 1, wherein the second data block is stored in a storage pool comprising at least one disk.

9. The method of claim 8, wherein the storage pool is divided into a plurality of metaslabs.

10. The method of claim 9, wherein each of the plurality of metaslabs is associated with one of plurality of metaslab IDs.

11. The method of claim 10, wherein the second data block location comprises one of the plurality of metaslab IDs and an offset.

12. The method of claim 1, wherein storing the second data block comprises using a storage pool allocator.

13. A system for storing a file comprising a file hole, comprising:
    a storage pool comprising the file, wherein the file comprises a first data block and a second data block, wherein the first data block is associated with the file hole and consists only of zeros; and
    a storage pool allocator configured to:
        store a first block pointer comprising a zero reference in a first indirect block, wherein the zero reference indicates that the first data block consists only of zeros;
        store the second data block; and
        store a second block pointer in a second indirect block, wherein the second block pointer references the second data block and comprises a second data block location,
    wherein the first data block is not stored.

14. The system of claim 13, wherein the storage pool allocator is further configured to:
    obtain a third data block associated with the file, wherein the third data block is associated with the file hole and consists only of zeros; and
    store a third block pointer comprising a zero reference in the first indirect block, wherein the zero reference indicates that the third data block consists only of zeros, wherein the third data block is not stored.

15. The system of claim 14, wherein the storage pool allocator is further configured to:
    de-allocate the first indirect block, wherein the first indirect block comprises a plurality of block pointers that comprise only zero references.

16. The system of claim 13, wherein the storage pool allocator is further configured to:
    store a third indirect block comprising a block pointer referencing the first indirect block.

17. The system of claim 16, wherein the storage pool allocator is further configured to:
    de-allocate the third indirect block, wherein each of a plurality of block pointers in the third indirect block comprise a zero reference.

18. The system of claim 13, wherein the storage pool is divided into a plurality of metaslabs.

19. The method of claim 18, wherein each of the plurality of metaslabs is associated with a plurality of metaslab ID.

20. The method of claim 19, wherein the second data block location comprises one of the plurality of metaslab IDs and an offset.

21. A computer system for storing a file comprising a file hole, comprising:
    a processor;
    a memory;
    a storage device; and
    software instructions stored in the memory for enabling the computer system under control of the processor, to:

obtain the file, wherein the file comprises a first data block and a second data block, wherein the first data block is associated with the file hole and consists only of zeros;

store a first block pointer comprising a zero reference in a first indirect block, wherein the zero reference indicates that the first data block consists only of zeros;

storing the second data block; and store a second block pointer in a second indirect block, wherein the second block pointer references the second data block and comprises a second data block location, wherein the first data block is not stored.

\* \* \* \* \*

UNITED STATES PATENT AND TRADEMARK OFFICE
CERTIFICATE OF CORRECTION

PATENT NO.        : 7,225,314 B1                                        Page 1 of 1
APPLICATION NO. : 10/853915
DATED             : May 29, 2007
INVENTOR(S)       : Jeffrey S. Bonwick et al.

It is certified that error appears in the above-identified patent and that said Letters Patent is hereby corrected as shown below:

On the coverpage, item (57) Abstract, line 6, after the word "first", add --data block in a storage pool, obtaining a first data block location for the first data block,--.

Signed and Sealed this

Fourteenth Day of August, 2007

JON W. DUDAS
*Director of the United States Patent and Trademark Office*